United States Patent [19]

Färber

[11] 4,213,031
[45] Jul. 15, 1980

[54] HEAT SEALING ROLLER HAVING A TEMPERATURE SELF-CONTROLLED PTC HEATING RESISTOR FOR WELDING THERMOPLASTIC FOILS

[75] Inventor: Karl-Heinz Färber, Giengen, Fed. Rep. of Germany

[73] Assignee: Bosch-Siemens Hausgeräte GmbH, Stuttgart, Fed. Rep. of Germany

[21] Appl. No.: 844,299

[22] Filed: Oct. 21, 1977

[30] Foreign Application Priority Data

Oct. 21, 1976 [DE] Fed. Rep. of Germany ....... 2647444

[51] Int. Cl.² .................. H05B 3/10; B21B 27/08; B30B 15/34
[52] U.S. Cl. ........................... 219/244; 156/582; 156/583.1; 219/469; 219/471; 219/505
[58] Field of Search ............... 219/244, 245, 243, 241, 219/504, 505, 469–471; 156/582, 583

[56] References Cited

U.S. PATENT DOCUMENTS

| | | |
|---|---|---|
| 1,101,821 | 6/1914 | Van Aller ............... 219/245 UX |
| 1,497,223 | 6/1924 | Moodie ............... 219/469 |
| 2,579,063 | 12/1951 | Andrews ............... 156/583 |
| 2,591,383 | 4/1952 | Spalding ............... 219/244 |
| 2,679,572 | 5/1954 | Workman ............... 219/469 |
| 2,861,163 | 11/1958 | Asakawa ............... 219/504 UX |
| 2,924,694 | 2/1960 | Kreider ............... 219/583 |
| 3,138,695 | 6/1964 | Bracich ............... 156/582 X |
| 3,243,753 | 3/1966 | Kohler ............... 219/504 UX |
| 3,401,439 | 9/1968 | Staats et al. ............... 219/244 X |
| 3,484,325 | 12/1969 | Pendleton ............... 156/582 |

FOREIGN PATENT DOCUMENTS

651591 10/1928 France ....................... 219/469
102293 11/1923 Switzerland ............... 219/469

Primary Examiner—A. Bartis
Attorney, Agent, or Firm—Herbert L. Lerner

[57] ABSTRACT

A welding device for welding together at least two superimposed foils of thermoplastic synthetic material includes an electrically heated temperature-controlled sealing roller and a counterpressure organ cooperating with roller to form a heated zone in which the foils are tightly welded while pressure is applied thereto. The sealing roller comprises a circular disk-like PTC (positive temperature coefficient) resistor which serves as the heating element and the temperature control, with the PTC resistor having a resistance characteristic which rises steeply in the range of the operating temperature of the sealing roller. The PTC resistor serving as the heating element comprises the effective part of the sealing roller which acts directly on the foils to be welded and has axially opposite electrically conductive end faces each provide with a disk-like metallic contact surface rotatable with the resistor and in electrical contact with the axial end faces. The welding device includes means for supplying electric heating current to the disk-like resistor through the axial end faces thereof via the contact surfaces.

8 Claims, 4 Drawing Figures

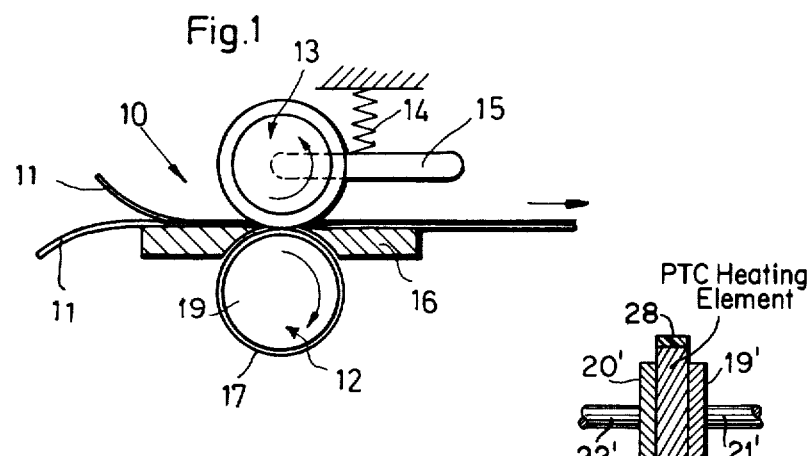
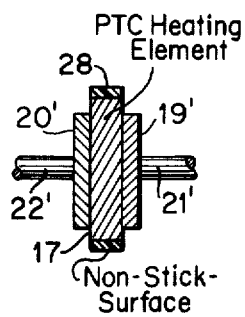
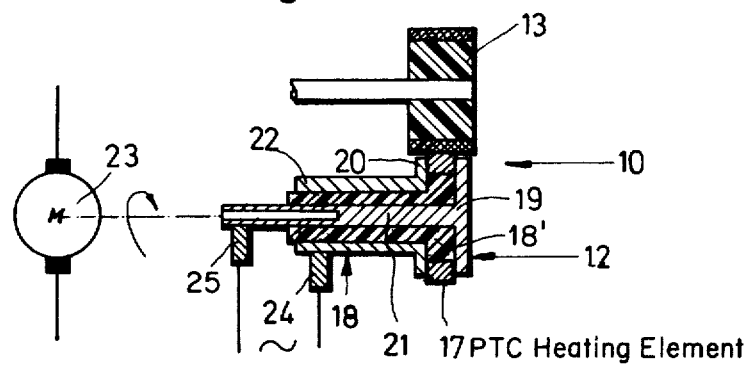
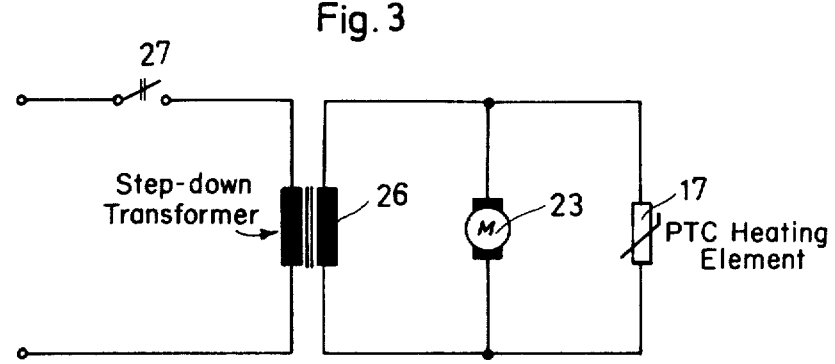

HEAT SEALING ROLLER HAVING A TEMPERATURE SELF-CONTROLLED PTC HEATING RESISTOR FOR WELDING THERMOPLASTIC FOILS

BACKGROUND OF THE INVENTION

1. Field of the Invention

This invention relates to a welding device and more particularly refers to a welding device for sealing at least two superimposed foils of thermoplastic synthetic material, having at least one electrically heated, temperature-controlled sealing roller and a counterpressure organ cooperating with the sealing roller, such as a contact roller or the like, between which is a heated zone where the foils are welded while pressure is being applied.

2. Background of the Invention

In known welding devices of the type mentioned, it is customary to equip the sealing roller with electric heating elements, the temperature of which is kept constant at the optimum value for the welding operation by means of control devices. The constant maintenance of the optimum welding temperature is of decisive importance, particularly in the welding of thin films in obtaining a welded seam of good quality. Temperature variations result either in a poor bond and leaks caused thereby, or in welding-through or burning-up of the foils to be welded, and thus lead to unsatisfactory welding results.

In the known welding devices, the accurate maintenance of the temperature, which is absolutely necessary in the interest of making satisfactory welded seams, can be achieved only by a relatively large expenditure for complicated control devices. These control devices require considerable space and in addition, require one or several temperature sensors or temperature interrogating devices which must be housed directly in the sealing roller because of the needed high accuracy of the temperature control.

A sealing roller thus equipped with heating elements and temperature interrogating devices has, however, of necessity, a large diameter, so that such sealing rollers can only be used in large commercial machines and are unsuitable for use in small, handy equipment.

The relatively large dimensions of the known sealing rollers have the further disadvantage that they have a large mass and as a result, a large thermal inertia, which necessitates long heating-up times with correspondingly long cooling-down times. Thus, the welding devices equipped therewith are ill suited for short-term or only occasional use.

A further aggravating disadvantage in known welding devices is the fact that the temperature interrogation devices are arranged only point-wise at the circumference of their sealing rollers. As a result, the heating system reacts sluggishly in the event of sudden local temperature deviation due perhaps to increased heat conduction or the like, at the effective working surface of the sealing roller. If, for instance, one point on the circumference of the sealing roller has a lower temperature than the rest of the points on the circumference of the sealing roller due to sudden, work-related cooling-off, then an immediate reheating is initiated only if the temperature interrogating device is located exactly at the colder point. However, if the sudden cooling-down occurs at a point which is far removed from the temperature interrogating device and is therefore picked up only with a corresponding delay, then temperature variations come about at the circumference of the sealing roller which can easily result in overheating or excessive cooling-down of parts of the working surface of the sealing roller and therefore lead to an unsatisfactory welding result.

SUMMARY OF THE INVENTION

It is an object of the invention to provide a welding device for welding superimposed foils with improved and simplified heating and temperature controls. Another object of the present invention is to provide a welding device for welding superimposed foils with a sealing roller having a small amount of thermal inertia, so that the sealing roller has small dimensions, enabling welding equipment provided with such sealing rollers to find application as household appliances.

With the foregoing and other objects in view, there is provided in accordance with the invention a welding device, especially for sealing at least two superimposed foils of thermosplastic synthetic material, having at least one electrically heated temperature-controlled sealing roller and a counterpressure organ cooperating with the sealing roller. Between the sealing roller and counterpressure organ is a heated zone in which the foils are tightly welded while pressure is being applied. The sealing roller is equipped with a PTC (positive temperature coefficient) resistor which serves as the heating element and the temperature control. The PTC resistor has a resistance characteristic which rises steeply in the range of the operating temperature of the sealing roller. The PTC resistor serving as the heating element is the effective part of the sealing roller which acts directly on the foils to be welded together. The PTC resistor has axially opposite end faces, each provided with electrically conductive means rotatable with the resistor and providing a contact surface. The welding device includes means for supplying electric current for heating to the PTC resistor via the electrically conductive means.

Other features which are considered as characteristic for the invention are set forth in the appended claims.

Although the invention is illustrated and described herein as embodied in a welding device, especially for sealing of at least two superimposed foils of thermoplastic synthetic material, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 shows a pair of rollers, consisting of a sealing roller and a spring-loaded contact roller, of an electrically operated welding device for thin films of thermosplastic synthetic material, as seen in the axial direction from the operator's side; and FIG. 2 is a cross section as seen from the side of the pair of rollers corresponding to FIG. 1, with a symbolically shown drive motor for this pair of rollers; and FIG. 3 is a simplified circuit diagram of a welding device with a pair of rollers according to FIGS. 1 and 2, operated with low voltage via a transformer.

FIG. 4 is a sectional view of a sealing roller with a PTC resistor in the form of a circular disk which acts directly on the foils to be welded together and has at its circumference a surface preventing the material to welded from sticking to it.

DETAILED DESCRIPTION OF THE INVENTION

The sealing roller is equipped with a PTC (positive temperature coefficient) resistor which serves as the heating element and temperature control and whose resistance characteristic rises steeply in the range of the operating temperature of the sealing roller.

By means of the dual function of the PTC resistor, the dimensions and therefore also the thermal inertia of such a sealing roller can be reduced substantially, so that thereby the disadvantages described at the outset are avoided and accurate maintenance of the welding temperature is assured.

One advantageous embodiment of the invention is to make the PTC resistor, serving as the heating element, itself the effective part of the sealing roller which serves directly for welding the foils. By using the PTC resistor itself as the effective part of the sealing roller, the thermal inertia of the latter and the disadvantages caused thereby can be eliminated in an almost ideal manner almost completely. Due to the well-known properties of a PTC resistor, any temperature change which may occur at the sealing roller during the welding process even if locally limited, results in an immediate change in its electric resistance and therefore, also of the heating current. In this manner, temperature changes that occur are instantly compensated by an accurately controlled supply of heat, which makes the accurate maintenance of the optimum welding temperature possible.

The PTC resistor can be shaped either as a circular disk or as a circular ring, which act with their outer circumference directly on the foils to be welded together. In this regard, the PTC resistor as a circular ring has been found to be particularly economical and also favorable with respect to the desired reduction of the thermal inertia of the sealing roller.

A welding device in accordance with the invention, for joining thin films of thermoplastic synthetic material, which works with a sealing roller and can be used for household purposes, is shown simplified and schematically in the drawings.

A welding device shown in FIGS. 1 and 2 for sealing superimposed foils 11 of thermoplastic synthetic material has its welding tool in the form of a pair of rollers 10. The rollers 10 are composed of an electrically heated temperature-controlled sealing roller 12 and a contact roller 13 which cooperates with the former as a counterpressure organ. The contact roller 13 is supported at the movable end of a rocker arm 15 tensioned by a spring 14 in such a manner than it exerts with its running surface a uniform pressure on the running surface of the sealing roller 12 and the foils 11 passing through in between the contact roller 13 and the sealing roller 12.

A table 16 is arranged at the height of the point of contact of the pair of rollers 10 formed by the sealing roller 12 and the contact roller 13. Table 16 serves to guide the foils 11 to be welded together between the pair or rollers 10 and is provided for this purpose with a suitable cutout adapted to the shape of the sealing roller 12.

As can be seen particularly from FIG. 2, in which the pair of rollers 10 is shown without the table 16 and the foils 11, the sealing roller 12 has a PTC resistor 17 which has the shape of a circular ring. PTC resistor 17 performs the dual function of the heating element and the temperature control. The outer circumferential surface of PTC resistor 17 rolls directly on the running surface of the contact roller 13 and thus acts as the effective part of the sealing roller 12 directly on the foils 11 to be welded together. The current is supplied to the PTC resistor 17 via its axially opposite end faces. In the specific case shown, this is done via a drive shaft 18 which is attached to one side of the sealing roller 12 and which has two disk-like contact surfaces 19 and 20. These are mounted at the ends of two conductors 21 and 22, which are arranged coaxially to each other and are electrically insulated from each other by insulator 18'. The current is fed to the drive shaft 18, which can be driven by a drive motor 23 via sliding contacts 24 and 25 which rest against the respective conductors 21 and 22 and are in turn connected to the power supply of the welding device.

The circuit of the PTC resistor, which assumes the function of the heating element and the temperature control and likewise that of the effective part of the sealing roller 12, can be seen from the circuit diagram shown in FIG. 3. The PTC resistor 17 is connected parallel to the drive motor 23 in the secondary circuit of a transformer 26, which is fed with line current. The power switch 27 is located in the primary circuit of the transformer 26. This transformer 26 steps down the operating voltage of the welding device and the necessary safety against contact at the sealing roller 12 is obtained thereby.

The drive of the pair of rollers 10 can be designed in a known manner so that the drive motor drives only the sealing roller 12. Then, the contact roller 13 corotates due to the friction exerted on it at its running surface. It has been found, however, that because of the unavoidable slippage which occurs in the process and the waviness caused thereby of the welded seam of the foils 11 to be sealed, a counterrotating drive of the sealing roller 12 and the contact roller 13 forming the pair of rollers, automatically obtained by means of a known gear mechanism, is more advantageous.

The different welding temperatures required for different foil thicknesses or materials can be adjusted as desired by changing the voltage and/or changing the driving speed of the pair of rollers 10 and thereby, the running speed of the foils 11.

In a modification shown in FIG. 4, the PTC resistor 17 used as the effective part of the sealing roller, is firmly clamped between disk-like ends 19' and 20' of shaft ends 21' and 22' brought to the PTC resistor from opposite sides. The disk-like ends 19' and 20' are separated by insulator 18'. In addition, suitable contact with the PTC resistor 17 serving as the effective part of the sealing roller may be made in any known manner, for instance, by means of sliding contacts applied to opposite axial end faces of the resistor. It is necessary here to provide the end faces with a highly conductive coating, for example, of silver.

The running surface of the PTC resistor 17 serving as the effective part of the sealing roller can be provided with a surface 28 preventing the material to be welded from adhering to it. It has been found, however, that the materials to be welded do not stick with PTC resistors with a ceramic base.

Due to the special design of the effective part of the sealing roller as a PTC resistor and the well-known properties of PTC resistors, the optimum welding temperature at the sealing roller can be maintained exactly. Any temperature change even occurring only locally at the PTC resistor results in a change of the resistance there and in a correspondingly changed flow of current, which brings about instant temperature compensation. The known properties of the PTC resistor have the effect that the sealing roller which is still cold when the equipment is switched on, reaches the required operating temperature almost instantly because of the reduced resistance and the consequently increased current drain of the PTC resistor. The welding is therefore immediately available for the welding operation. Thus, a welding device equipped with the sealing roller designed in accordance with the invention is particularly well suited for short-time operation such as is common in the household or in a hobby shop, the heretofore necessary waiting times up to full operational readiness of the device being completely eliminated.

There are claimed:

1. In a welding device for sealing at least two superimposed foils of thermoplastic synthetic material having at least one electrically heated temperature-controlled sealing roller and a counterpressure organ cooperating with the sealing roller between which is a heated zone in which the foils are tightly welded while pressure is being applied, the improvement comprising the sealing roller equipped with a circular disk-like PTC (positive temperature coefficient) resistor which serves as the heating element and the temperature control, with the PTC resistor having a resistance characteristic which rises steeply in the range of the operating temperature of the sealing roller, the PTC resistor serving as the heating element being the effective part of the sealing roller which acts directly on the foils to be welded together, the disk-like PTC resistor having electrically conductive axially opposite end faces, each provided with a disk-like metallic contact surface rotatable with said resistor and in electrical contact with the end face of the resistor, and the welding device including means for supplying electric current for heating to the PTC resistor through the axial end faces thereof via said contact surfaces.

2. Welding device according to claim 1, wherein the PTC resistor is a circular disk which acts with its circumference directly on the foils to be welded together.

3. Welding device according to claim 1, wherein the PTC resistor is a circular disk apertured at the center to form a circular ring which acts with its outer circumference directly on the foils to be welded together.

4. Welding device according to claim 1, wherein the sealing roller is mounted on a shaft, and wherein disk-like contact surfaces are mounted at the shaft of the sealing roller in contact with said opposite axial end faces of the PTC resistor.

5. Welding device according to claim 4, wherein the shaft of the sealing roller has conductors which comprise the means for supplying current through said disk-like contact surfaces and which are electrically insulated from each other and are connected to the individual disk-like contact surfaces.

6. Welding device according to claim 5, wherein said conductors comprise two coaxially arranged conductors which are electrically insulated from each other and which together form said shaft.

7. Welding device according to claim 1, wherein the PTC resistor which acts directly on the foils to be welded together has at its circumference a surface preventing the material to be welded together from sticking to it.

8. Welding device according to claim 1, including a transformer interposed in the means for supplying electric current for reducing the voltage of the electric current to the PTC resistor and heating the PTC resistor via its opposite axial end faces with the lower voltage electric current.

* * * * *